G. DE' LIGUORO PRESICCE.
CINEMATOGRAPHIC PROCESS.
APPLICATION FILED APR. 7, 1919.
1,358,110.
Patented Nov. 9, 1920.
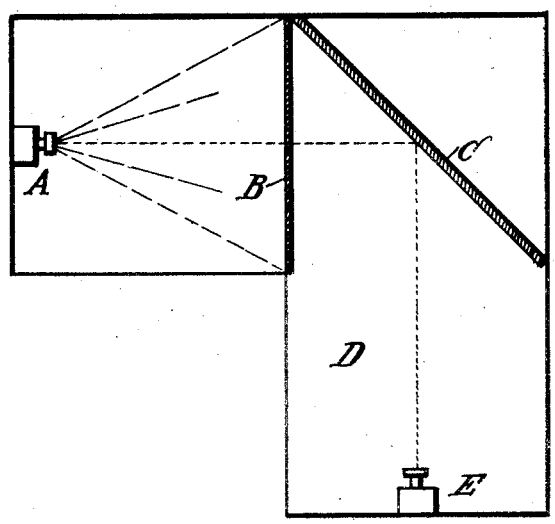
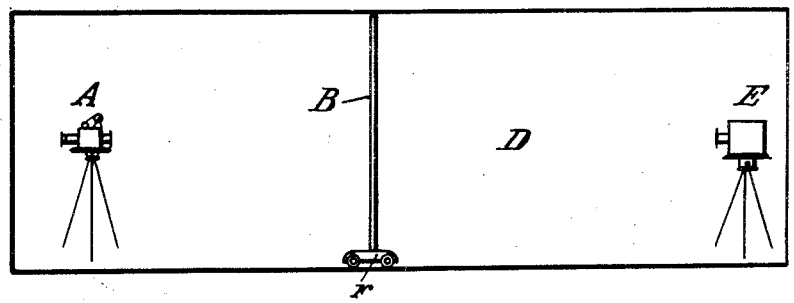
Inventor
G. de'L. Presicce
By H. R. Kerslake
Atty.

UNITED STATES PATENT OFFICE.

GIUSEPPE DE' LIGUORO PRESICCE, OF ROME, ITALY.

CINEMATOGRAPHIC PROCESS.

1,358,110. Specification of Letters Patent. Patented Nov. 9, 1920.

Application filed April 7, 1919. Serial No. 288,167.

*To all whom it may concern:*

Be it known that I, GIUSEPPE DE' LIGUORO PRESICCE, of Rome, Italy, have invented certain new and useful Improvements in Cinematographic Processes, of which the following is a specification.

The present invention relates generally to photography and more particularly relates to a cinematographic process.

The principal object of the invention is to provide a cinematographic process the effect of which is to reproduce fancy cases of doubtless novelty and of an astonishing and extremely interesting nature.

Another object of this invention is to provide a process which is to show in motion and working together such beings who never could come in proximity with one another.

A further object of the invention resides in the production of films resulting from the combination of scenical pictures with real photographic performances or from the combination of two or more cinematographic films.

With this end in view, fixed pictures as landscapes, streets, mansions and the like, taken out of nature are projected on a screen and presented either by reflection or directly to the cinematographic camera, which, while taking the said picture in addition takes a picture of the performance carried on by the actors in front of said pictures.

According to the present process, the projected background may consist of a cinematographic action as for instance in the case of the preparation of a compound film, comprising a real field of horse-races serving as a setting and a group of players acting in front thereof, for the sake of convenience termed a "fiction."

In such case, the background is formed by the projection of the film taken out of nature, while the "fiction" is being performed on the foreground which may represent a corner of a bookmaker-stand.

A compound duplex film of such description being prepared it may be used as a background for triplex film, proceeding in the way as stated above and as will be explained in detail hereafter.

The process comprises further in providing either the projecting machine or the taking camera with an optical apparatus arrangement of glasses, suitable for regulating the proportions (ratio) between the objects of the motion picture background and the actors in the foreground, in order to give a natural perspective view of the whole.

The invention comprises further means for varying the position of the background both angularly and translatorily.

The invention will be better understood with reference to the annexed drawing, of which:

Figure 1 shows a diagrammatic view of a system for the carrying on of the invention.

Fig. 2 shows a second form of arrangement of said system.

Throughout the drawing:

—A— is the projecting machine of the background, —B— is the screen receiving the projection from said machine eventually through colored glasses (a watered screen, translucent screen). Colored glasses may be used in front of a projecting lamp in order to render the screen-picture extremely actinic. —C— is a mirror which reflects said projection back to the taking cinematographic camera. —E—, —D— is the theater scene, whereon the actors perform the additional action.

In Fig. 2 the screen —B— faces the taking camera —E— and the projecting machine is situated at the back of said screen.

The screen —B— is provided with foot-rollers —r— which enables the varying of its angular position and its distance in respect of both the taking and projecting machine.

The illumination of the actors (staged action) is preferably of a highly actinic character, and effected with ultra-violet rays through suitable diaphragms and colored screens, as known to any person skilled in the art of photography.

Having now particularly described the nature of my invention, and the manner in which the same should be performed, I declare that what I claim is:—

Cinematographic process consisting in projecting moving pictures on a transparent screen, reflecting said screen-pictures by a mirror, carrying on a staged action in front of said reflected pictures, said action and said pictures being set in realistic relationship to one another, taking said reflected pictures and said action by a cinematographic camera, reproducing a diapositive from the negative film obtained by said camera and projecting said diapositive on a screen.

In testimony whereof I affix my signature in presence of two witnesses.

GIUSEPPE de' LIGUORO PRESICCE.

Witnesses:
GUAMMORE E. GRATONY,
IVAN LAVRETSKY.